(12) United States Patent
Hsia et al.

(10) Patent No.: US 9,808,737 B2
(45) Date of Patent: Nov. 7, 2017

(54) MEANS AND DEVICES TO COLLECT WATER VAPORS

(71) Applicants: Chih-Yu Hsia, Arcadia, CA (US); Michael Jonathan Hsia, Arcadia, CA (US); Patricia Shirley Hsia, Arcadia, CA (US)

(72) Inventors: Chih-Yu Hsia, Arcadia, CA (US); Michael Jonathan Hsia, Arcadia, CA (US); Patricia Shirley Hsia, Arcadia, CA (US)

(*) Notice: Subject to any disclaimer, the term of this patent is extended or adjusted under 35 U.S.C. 154(b) by 439 days.

(21) Appl. No.: 14/555,984

(22) Filed: Nov. 28, 2014

(65) Prior Publication Data

US 2016/0151720 A1    Jun. 2, 2016

(51) Int. Cl.
  *C02F 1/14* (2006.01)
  *B01D 1/00* (2006.01)
  *B01D 5/00* (2006.01)
  *C02F 103/08* (2006.01)

(52) U.S. Cl.
  CPC .......... *B01D 1/0005* (2013.01); *B01D 1/0035* (2013.01); *B01D 5/009* (2013.01); *B01D 5/0066* (2013.01); *C02F 1/14* (2013.01); *C02F 2103/08* (2013.01)

(58) Field of Classification Search
  CPC ...... B01D 1/0005; B01D 1/0035; B01D 3/00; B01D 5/0066; B01D 5/009; C02F 1/14; C02F 2103/08; F25D 21/14
  See application file for complete search history.

(56) References Cited

U.S. PATENT DOCUMENTS

| | | | |
|---|---|---|---|
| 6,663,750 B1* | 12/2003 | Coon | B01D 1/0005 126/600 |
| 2014/0238836 A1* | 8/2014 | Hsia | C02F 1/14 202/185.1 |

* cited by examiner

*Primary Examiner* — Brian McCaig

(57) ABSTRACT

A water vapor collector assembly, which consists of an optional capillary net, a dome, a water conveying channel, an optional capillary mat, a floatation base, and a water tube anchor, which many of it can be looped together by ropes and tubes and can float on sea surface to take sun rays to generate freshwater.

5 Claims, 22 Drawing Sheets

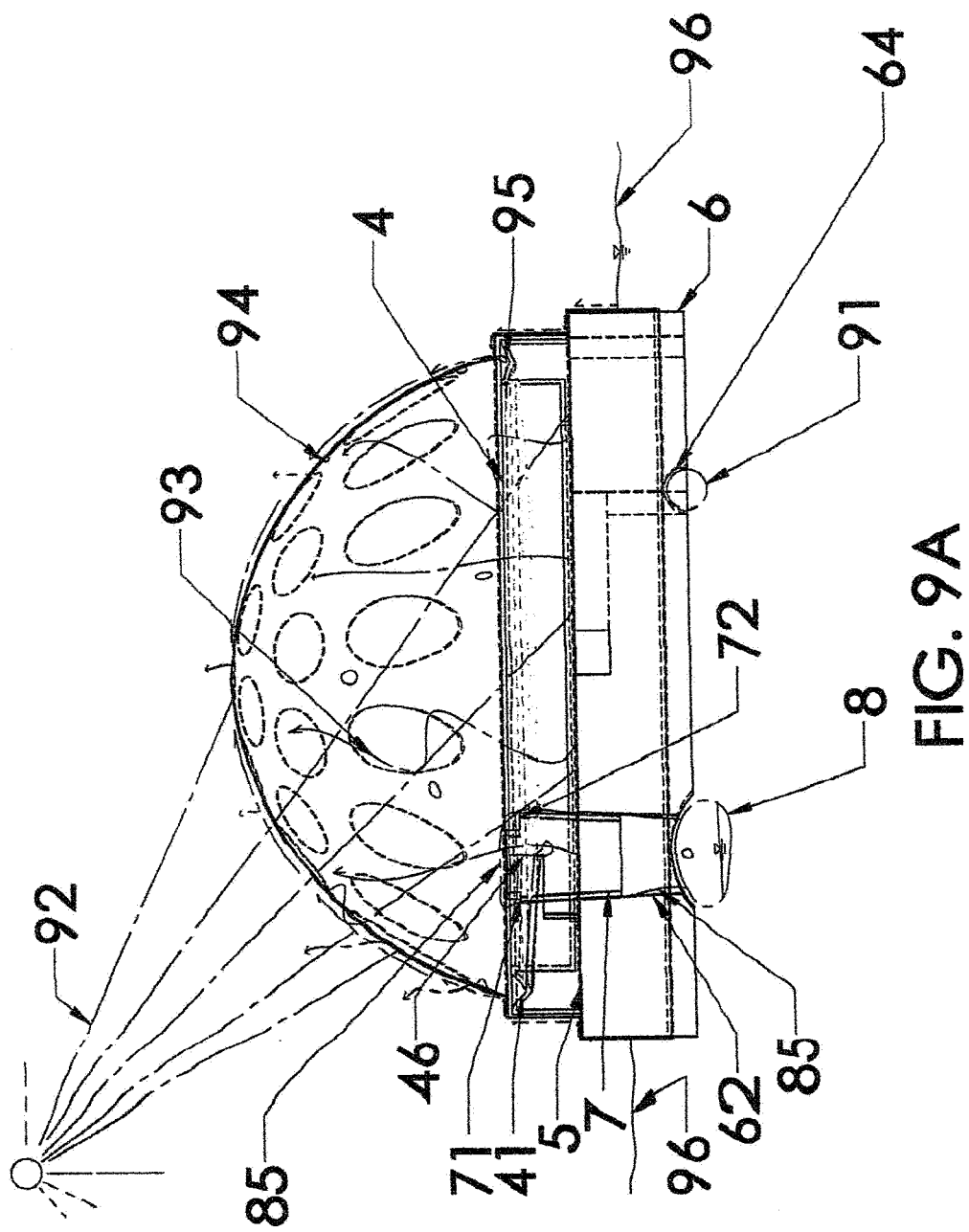

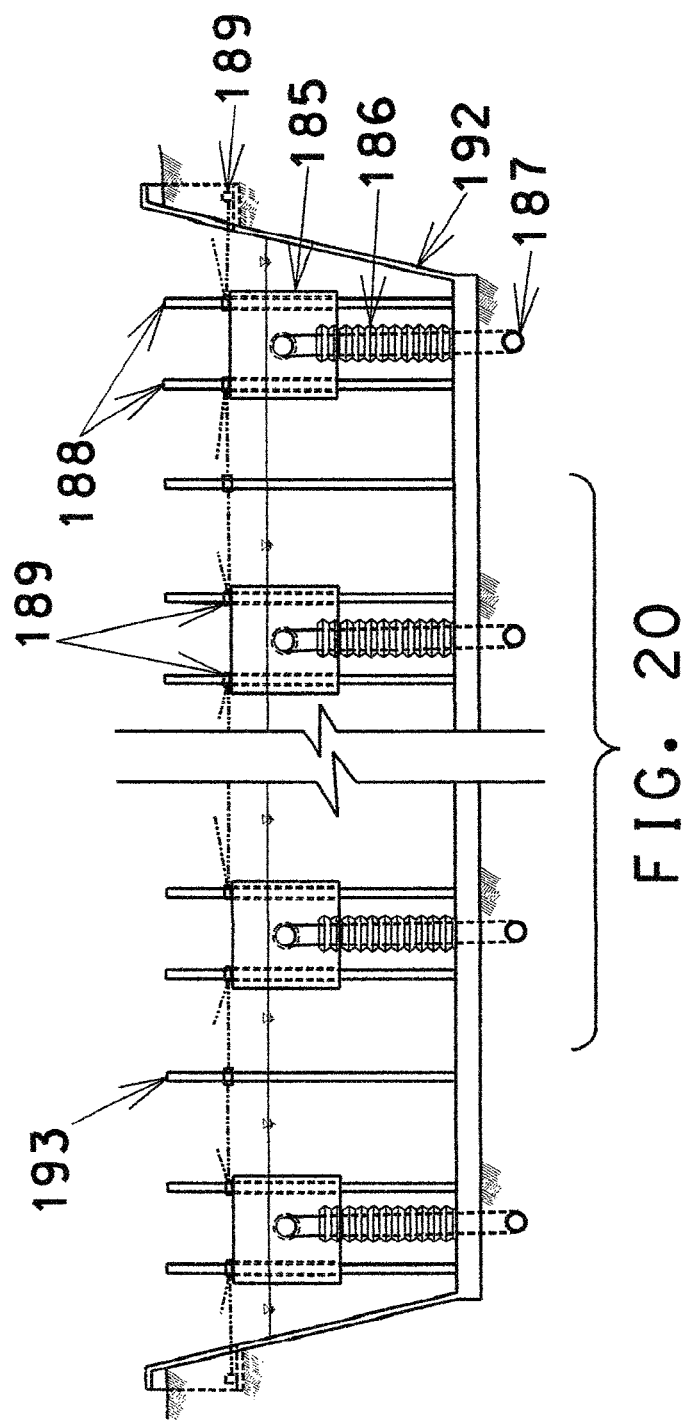

MEANS AND DEVICES TO COLLECT WATER VAPORS

CROSS-REFERENCE TO RELATED APPLICATIONS

Not Applicable.

BACKGROUND OF THE INVENTION

This invention relates to means to collect water vapors evaporated from a water surface.

Prior patent to Hsia (U.S. Pat. No. 7,654,103 B2) presented a freshwater collection system which comprises a vapor collector field formed by vapor collectors composed of floatable platforms with central holes and domed transparent roofs to collect water vapors which are evaporated by sun rays through the central holes then condensate/condense on the interior surfaces of the domes through sprinkling of waters which are supplied by pumps and sprinkler heads.

BRIEF SUMMARY OF THE INVENTION

Obtaining freshwater from seawater or the like can be done by reverse osmosis or evaporation/condensation processes. However, these processes require substantial energy and equipment. They produce relatively costly fresh waters. The uses of sun rays were also attempted. Hsia (U.S. Pat. No. 7,654,103 B2) suggested the use of sun rays to generate water vapors and to condensate them by sprinkled waters. However, these processes are slow and relatively inefficient. Therefore, means to produce relatively inexpensive freshwater from salt water have been sought.

The current invention will provide, inside a dome, a dark color wetted surface that can absorb sun rays to vaporize water. The invented devices then will use cool water transported by capillary forces in a net-like fabric on the exterior surface of the dome to increase condensation rate of the water vapors to create freshwater. Means and methods to collect and convey the created freshwater are also presented in this invention.

These and other objects and advantages of the invention, as well as the details of illustrative embodiments, will be more fully understood from the following specification and drawings, in which:

BRIEF DESCRIPTIONS OF THE SEVERAL VIEWS OF THE DRAWINGS

FIG. 9A is a sectional view which illustrates the function of the invented device shown in FIG. 1.

FIG. 19 and FIG. 20 are schematic plan and section views, respectively, which illustrate alternative means to bring freshwaters collected by the devices shown in FIG. 18 onto a shore.

DETAILED DESCRIPTION OF THE INVENTION

Figure 1:
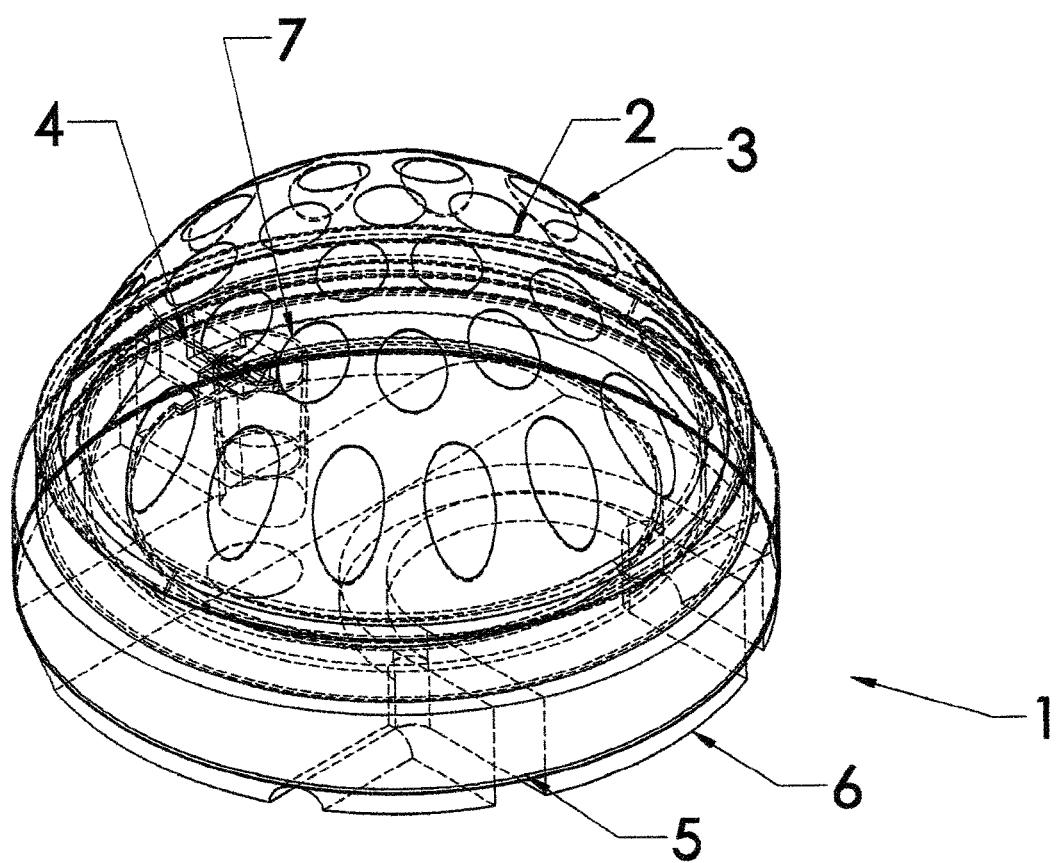
FIG. 1 is an isometric view of the invented device, the water vapor collector.
Figure 2:
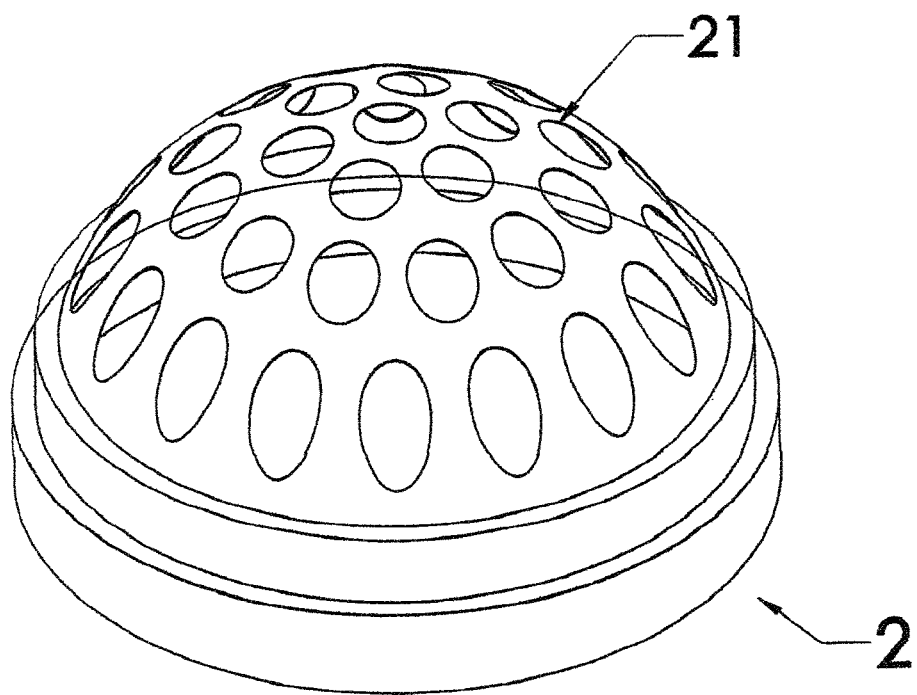
FIG. 2 is an isometric view of a component the capillary net, of the invented device shown FIG. 1.
Figure 3:
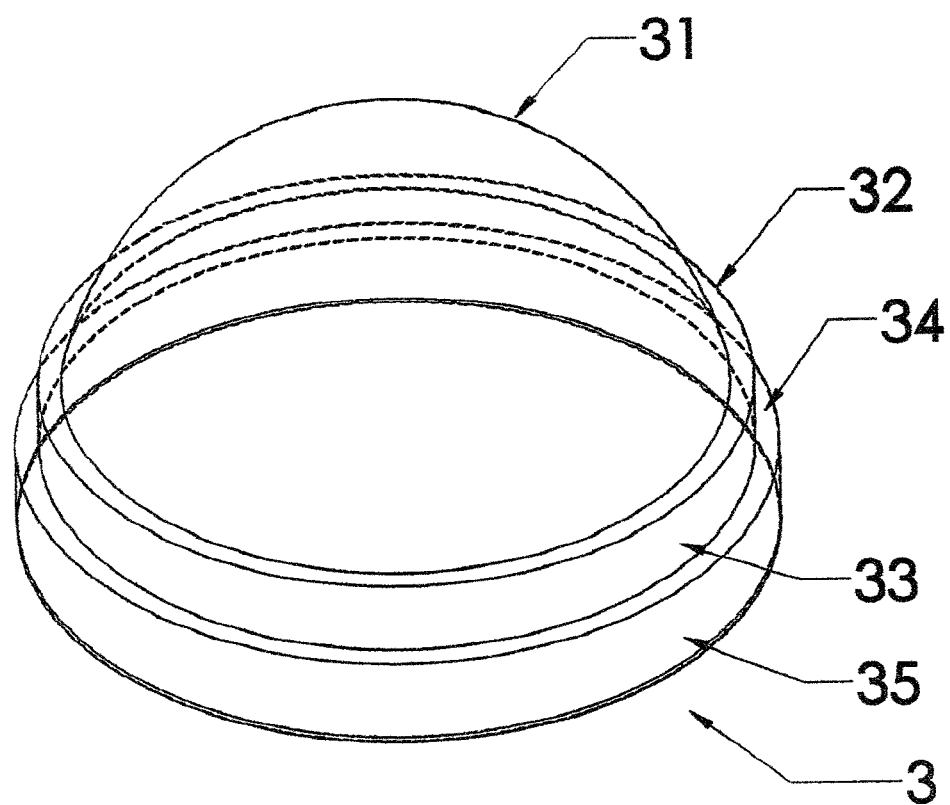
FIG. 3 is an isometric view of a component the dome, of the invented device shown in FIG. 1.
Figure 4:
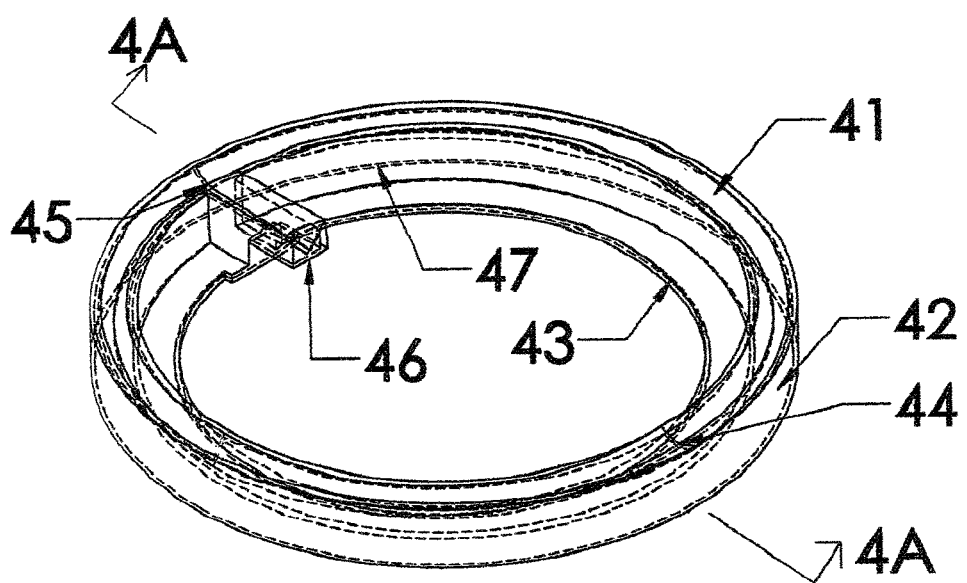
FIG. 4 is as isometric view of a component, the water conveying channel of the invested device shown in FIG. 1.
Figure 4A:
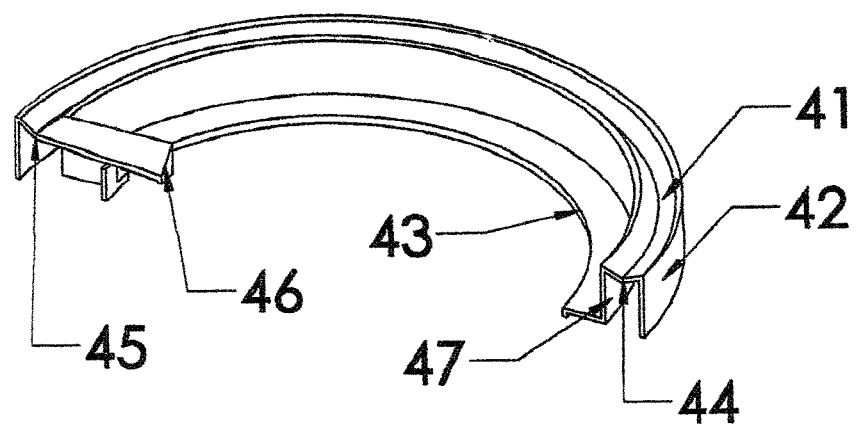
FIG. 4A is an isometric section view of the water conveying channel shown in FIG. 4.
Figure 5:
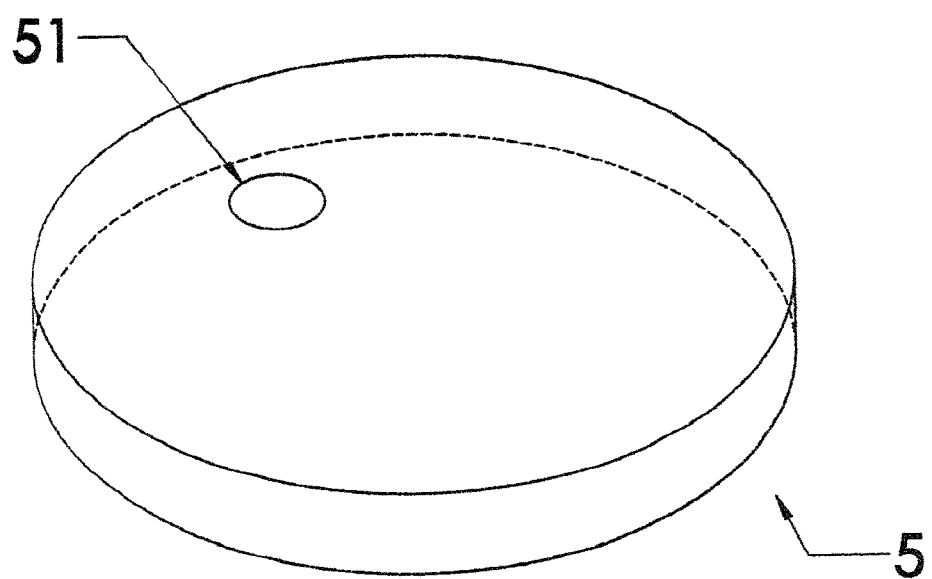
FIG. 5 is an isometric view of a component the capillary mat, of the invented device shown in FIG. 1.
Figure 6:
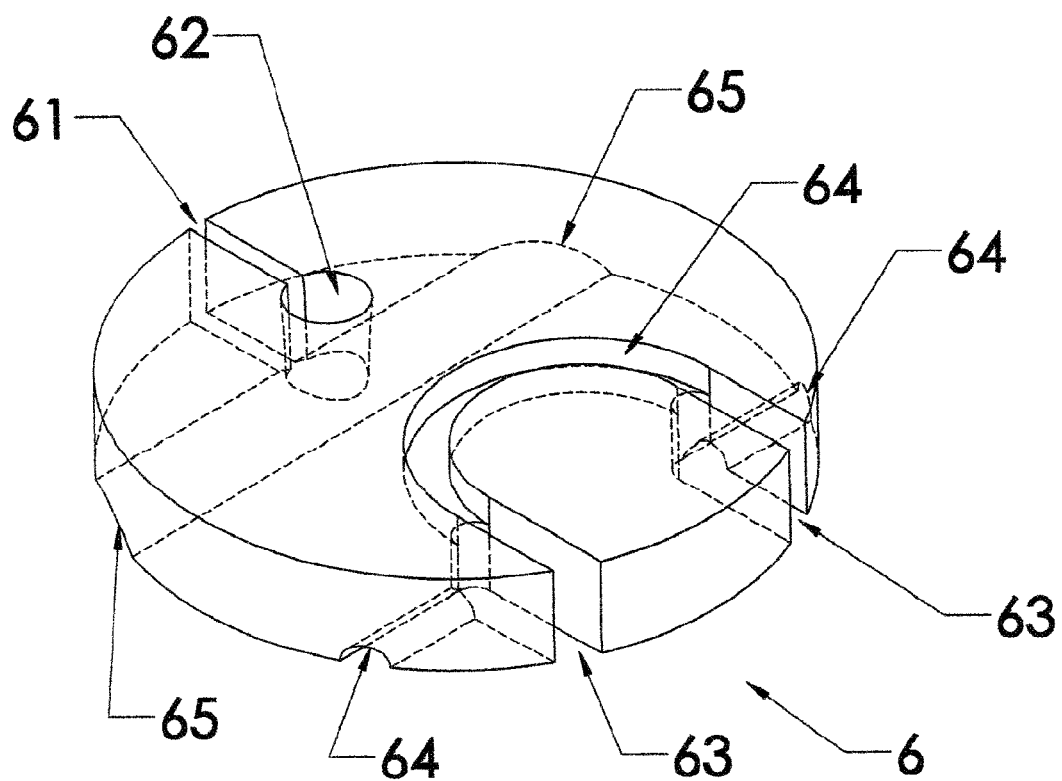
FIG. 6 is as isometric view of a component, the floatation base, of the invented device shown in FIG. 1.
Figure 7:
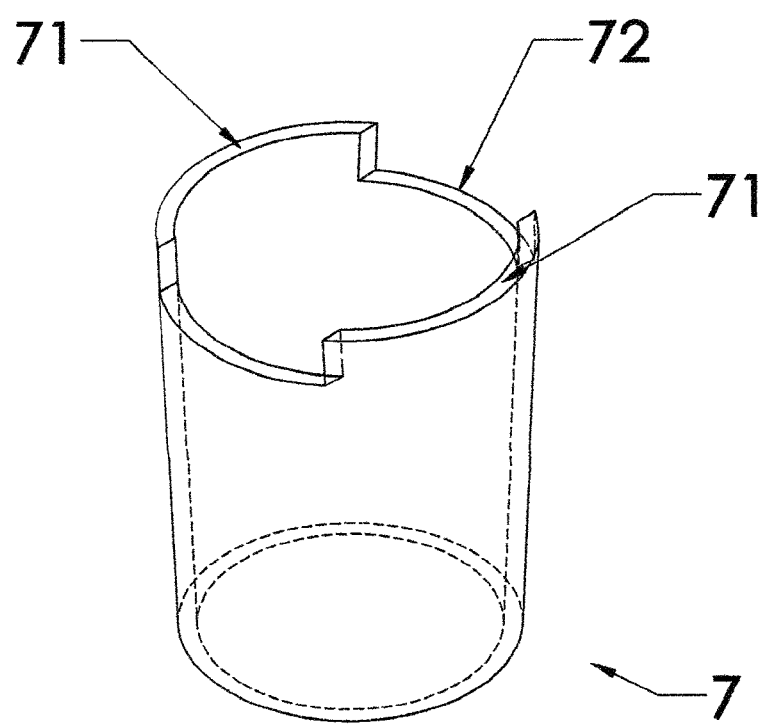
FIG. 7 is an isometric view of a component, the water tube anchor, of the invented device shown, in FIG. 1.

Referring to FIG. 1 through FIG. 7, the invented water vapor collector 1 consists of an optional capillary net 2, a dome 3, a water conveying channel 4, an optional capillary mat 5, a floatation base 6, and a water tube anchor 7. The capillary net 2 is a perforated fabric or knitted net that has many holes 21 and that can transmit water through capillary forces. The dome 3 is made of a transparent or semitransparent material that allows sun ray to penetrate through. The dome consists of a dome top 31, an upper shoulder 32, an upper curtain wall 33, a lower shoulder 34 and a lower curtain wall 35. The upper shoulder is a short flat surface extended outwards from the rim of the dome top. The upper curtain wall extended downward from the outer rim of the upper shoulder. The lower shoulder extends outwards from the lower rim of the upper curtain wall. The lower curtain wall extends downward from the outer rim of the lower shoulder. The water conveying channel 4 basically is a v-shaped channel loop 41 supported by two walls, the interior wall 47 and the exterior wall 42. The interior wall 47 is supported by a pedestal 43 which is a thin plate extended perpendicularly from the rim of the wall. The water conveying channel has a high point 44 and a low point 45. Near the low point the v-shaped channel turns toward the center of the channel loop and becomes its outlet 46. Any water drops in the water conveying channel can travel along the channel and drains out of the channel from the end of the outlet 46. The optional capillary mat 5 is a dark color fabric or mat, preferably black, which has an opening 51 on it. The capillary mat can transmit water by capillary forces. The floatation base 6 is made of a light weight material that can float on water surfaces. A penetrating slot, the tube slot 61, is at one edge of the floatation base. An enlarged penetrating opening, the tube opening 62, is at one end of the tube slot. The upper end of the tube opening is larger than this of its lower end. Opposite side of the tube slot 61 the floatation base has two penetrating slots, the rope slot 63. Two optional indented slots, the indented rope slot 64, are at one end of each rope slot 63. An optional indented slot, the indented tube slot 65, passing through one end of the tube opening 62, is at the bottom of the floatation base. When the floatation base is capable of transmitting water by capillary forces to its top surface, the capillary mat 5 becomes optional. The water tube anchor 7 is a short tube which one end is larger than the other end. There are at least two tabs 71 at the rim of its larger end 72. The capillary mat 5 can be placed on top of the floatation base with its edges dropping over the side surfaces of the floatation base. The water tube anchor 7 can be dropped through the opening 51 of the capillary mat 5 into the tube opening 62 of the floatation base 6 with its larger end 72 above the top surface of the floatation base. The water conveying channel 4 can be placed on the capillary mat or the floatation base, if the capillary mat is not used. The lower curtain wall 35 of the dome 3 can be snuggly fitted onto the floatation base and the capillary mat. The lower shoulder 34 of the dome can be rested on top of the floatation base. The water conveying channel 4 can be put between the floatation base and the upper shoulder 32 of the dome with the exterior wall 42 of the water conveying channel 4 next to the upper curtain wall 33 of the dome. The center of the v-shaped channel can be directly below the rim of the dome top 31. The end of the outlet 46 can be on top of the water tube anchor such that water can drop into the water tube anchor. The capillary net can be snugly fitted on the dome. The lower portions of the capillary net and the capillary mat can be adjacent to the bottom of the floatation base.

Figure 8:
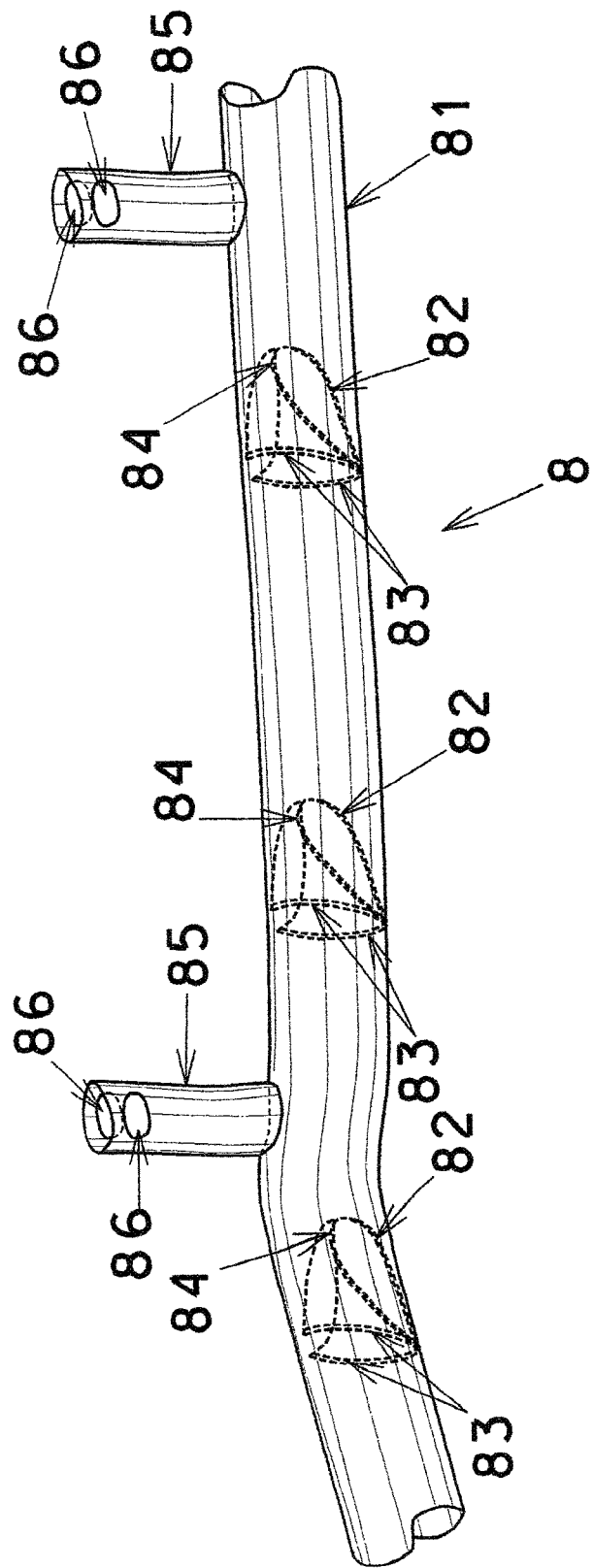
FIG. 8 is a schematic view of a component, the water tube, of the invented device shown in FIG. 1.
Figure 9:
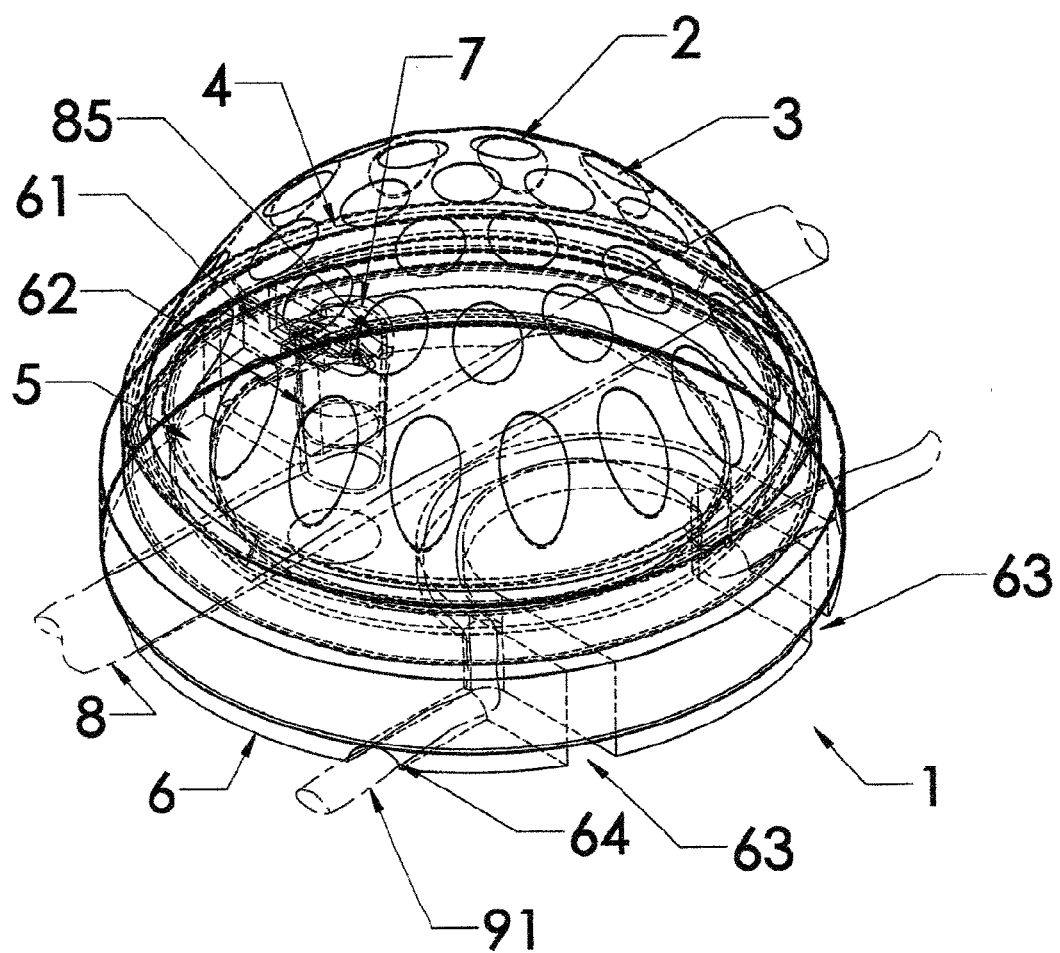
FIG. 9 is an isometric view of an invented water vapor collector equipped with a rope and a water tube.

Referring to FIG. 8, the water tube 8 is made of a flexible tube 81 which repeatedly and longitudinally has optional flaps 82 and flexible tubes 85. One end of the water tube is sealed (not shown) and the other end is connected to a water collection device (not shown) such as another water tube or pipe. The flap 82 is made of a flexible material and is mounted (schematically shown as 83) on the interior surface of the water tube. The flap thus has a free end 84. The flexible tube 85 is a short tube which branches off from the water tube 8 and which is made of flexible material. There are at least two slots, the anchoring slots 86, at near the free end of the flexible tube 85.

Referring to FIG. 9, FIG. 9A, FIG. 6, FIG. 5 and FIG. 7, when assembling a water vapor collector 1, a rope 91 is looped on a floatation base 6 through its two rope slots 63. Then the rope is put resting in the indented rope slots 64. A flexible tube 85 of a water tube 8 is squeezed through the tube slot 61 of the floatation base 6 then put in the tube opening 62. Then, when used, the optional capillary mat 5 is place on the floatation base with the opening 51 is over the tube opening 62. Then, the rim of the flexible tube 85 is put through the opening 31. The water tube anchor 7 is put into the flexible tube with the tab 71 penetrating the anchoring slots 86 of the flexible tube. The assembly of the flexible tube and the water tube anchor is put back into the tube opening 62. The slightly wedged shapes of the tube opening and the water tube anchor will squeeze the flexible tube in place. The water conveying channel 4, the dome 3 and the optional capillary net 2 then are assembled, in aforementioned manner. An adjacent water vapor collector can be assembled in the same way described on the same rope and the same water tube.

Referring FIG. 9A, when the water vapor collector 1 is put on the water, the capillary mat 5 (when being used) and/or the floatation base 6 will transport water and wet their top surfaces. The floatation base will keep the water vapor collector afloat on the water surface 96. The sun rays 92 will penetrate through the dome, heat the water on the surface of the capillary real and/or the floatation base, and cause water to evaporate. When the water vapors 93 reach the interior surface of the dome, water condensates 94 will occur on the surface. When the water condensates grow large/substantial enough, water drops 95 will occur. The water drops will be captured then conveyed by the v-shaped channel 41 to the outlet 46 of the wafer conveying channel 4. The water will then drop through, the water tube anchor 7 into the water tube 8. The large rim 72 of the water tube anchor 7 is above the surface of the capillary mat and/or the top of the floatation base; no water from the capillary mat and/or the floatation base will enter the water tube. The dark color surface of the capillary mat and/or the floatation base will, increase water evaporation rate. For the water vapor collector, the water vapor condensation rate depends on the rate of the heat fee dome can dissipate. When water can be vaporized on the exterior surface of the dome additional heat is removed and additional water condensates can then form on the dome. The capillary net is a fabric or a mat which can transport water and continuously provide water to the surface of the dome for evaporation. The holes on the capillary net will allow sun ray s to penetrate through and thus provide heat on the surface of the capillary mat and/or the floatation base for water evaporation.

Figure 10:
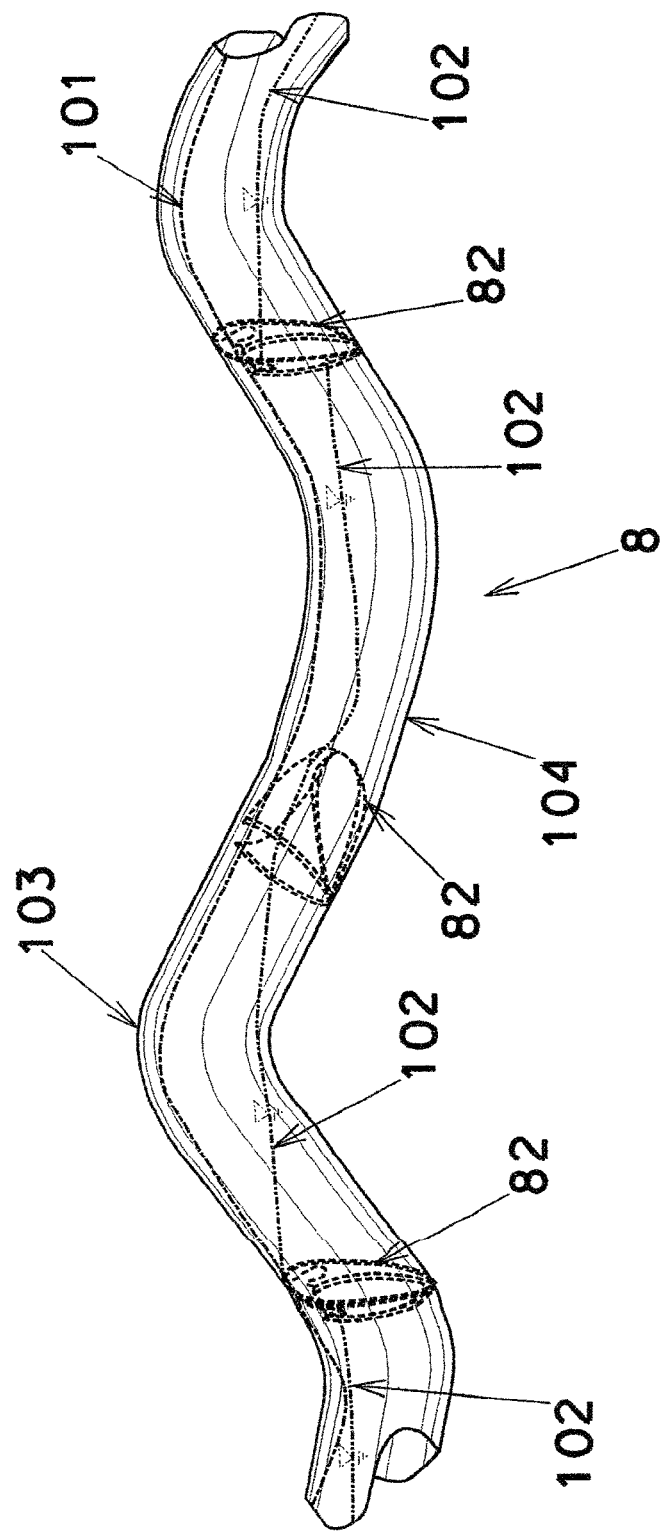
FIG. 10 is a schematic view which illustrates the function of the water tube shown in FIG. 8.

Referring to FIG. 10, when a water tube 8 is on a wind-induced wavy water surface 101, the water, generated by the vapor collectors (not shown) and entered through the flexible tubes (not shown), in the water tube will move around as the waves move. The water surfaces of the water are shown as 102. The moving water will push around the flaps 82. When water pushes up a flap toward the soffit 103 of the water tube, the flap tends to stop the water flow backward. When water pushes down a flap toward the invert 104 of the water tube, the flap tends to let the water flow over forwardly. At the peak of a wave, water in the water tube will have a high point and the water will flow downwards in both directions toward the valleys of the wave. Thus, within a segment of the water tube with two adjacent flaps, a portion, of the water will flow backwards to push up the upstream flap while the other portion will flow forwards to push down, the downstream flap. The downed downstream flap will allow water to flow into the next segment of the water tube but the upped upstream flap will not allow water to flow backwards. Therefore, as the winds push the waves, progressively water in the water tube will flow downwind and be transmitted downwind.

Figure 11:
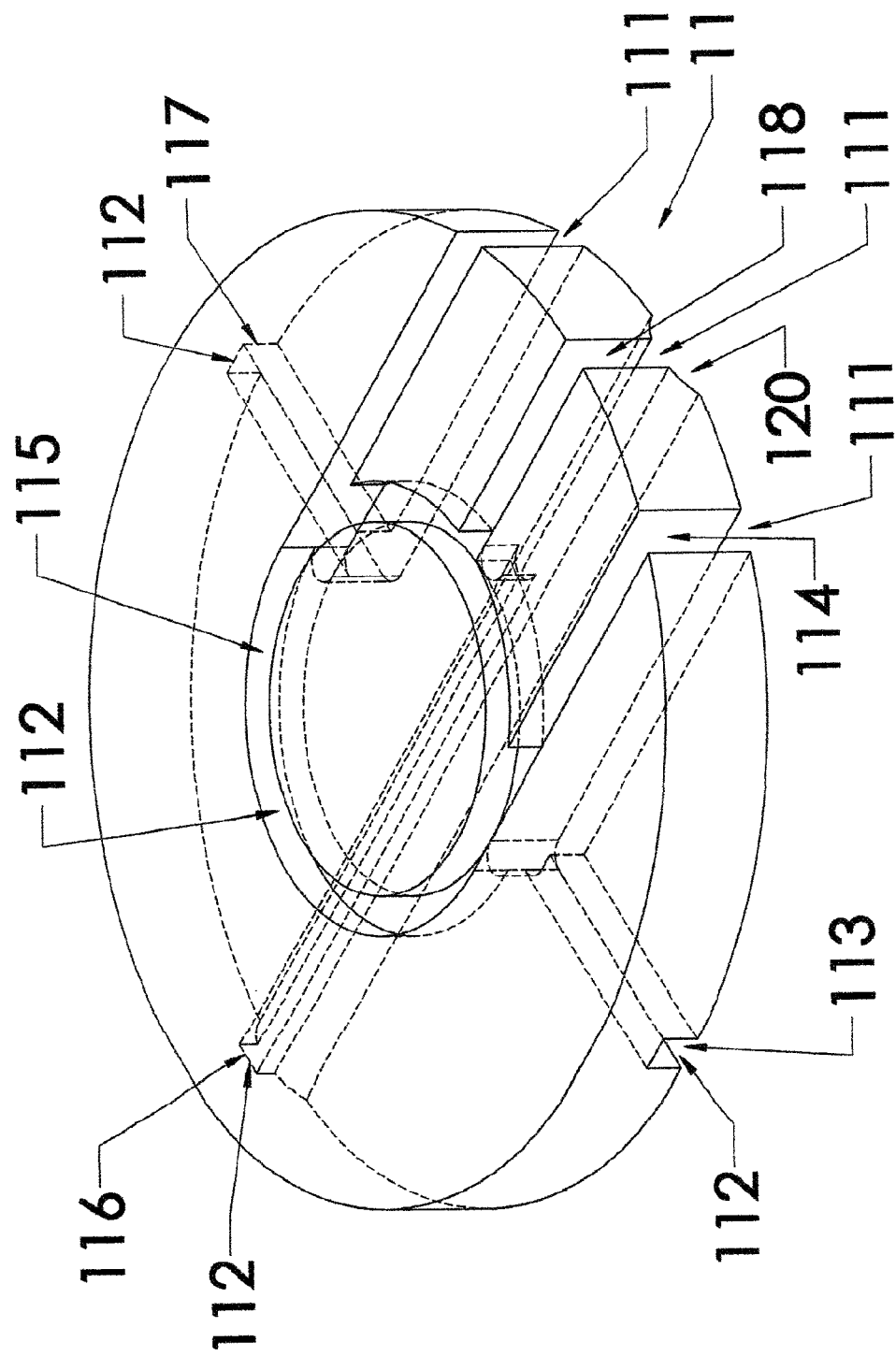
FIG. 11 is an isometric view of an optional component, the spacer, for the invention.

When two rows of the water vapor collectors need to be kept apart, spacers can be used. A spacer 11 (referring to FIG. 11), made of light weight material, has many penetrating slots 111 and many indented slots 112. The bottom of the spacer also has a indented tube slot 120 which provides a space for a water tube to pass through. The penetrating slots enable a spacer to the mounted on a rope. The indented slots enable a spacer to be locked on a rope. For examples, a rope loops along the slots 113, 114, 115 111 and 117 will enable a spacer to be mounted on the rope along its centerline. A rope loops along the slots 113, 114, 115, 118 and 116 will enable a spacer to be mounted on the rope to form a right angle.

A spacer can be put at the end of a first row of the water vapor collectors to allow the rope for the assemblies to make a 90-degree turn. A second, spacer can be added onto the rope. Then a third spacer is added on the rope to allow the rope to make another 90-degree turn. Then, the rope can be used for the second row of the water vapor collectors. In this way, the first and the second rows of the water vapor collectors are apart at a spacer's distance. A water tube can also pass underneath a spacer through, the indented tube slot.

Figure 12:
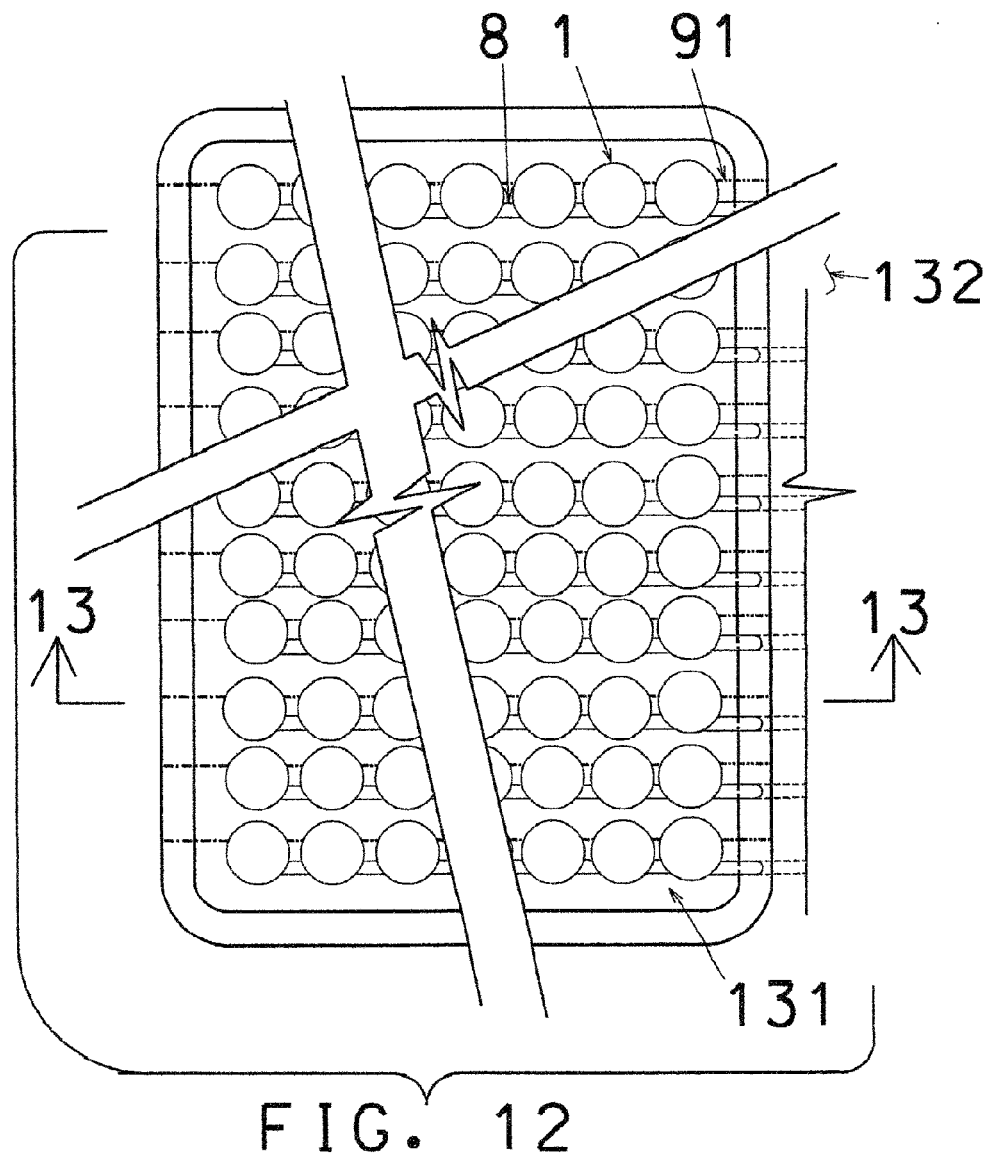
FIG. 12 and FIG. 13 are a schematic plan view and a schematic sectional view, respectively, which illustrate the uses of the invented device in an excavated pond.
Figure 13:
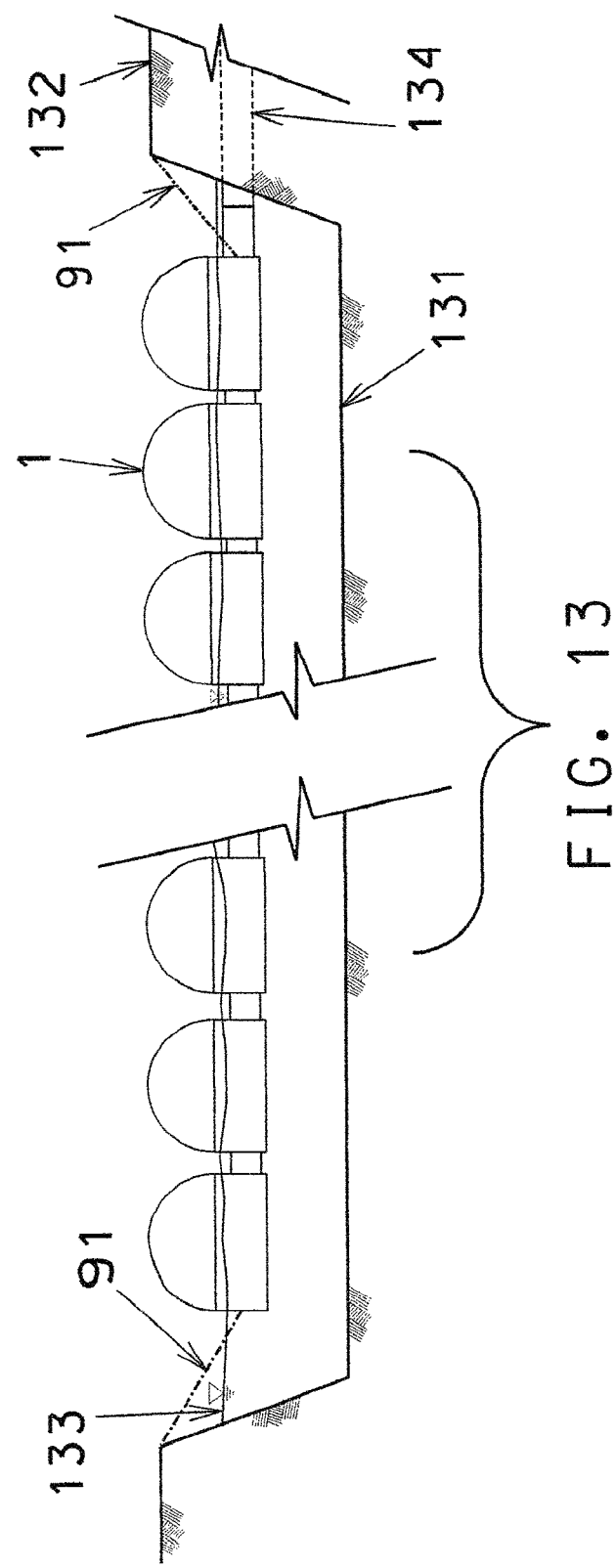

FIG. 12 and FIG. 13 illustrate an example for the use of the water vapor collector. The water vapor collectors 1 are put on a pond 131 dug on the earth 132. The water surface 133 of the pond can be maintained by inflows (not shown). The ends of the ropes are anchored on the earth 132. The water tubes 8 are connected to a rigid pipe 134 which leads the water generated by the water vapor collectors out of the pond to be collected. In this example, the water tubes may not have the flaps as the slopes of the water tubes can be relatively easy to be kept for water drainage.

Figure 14:
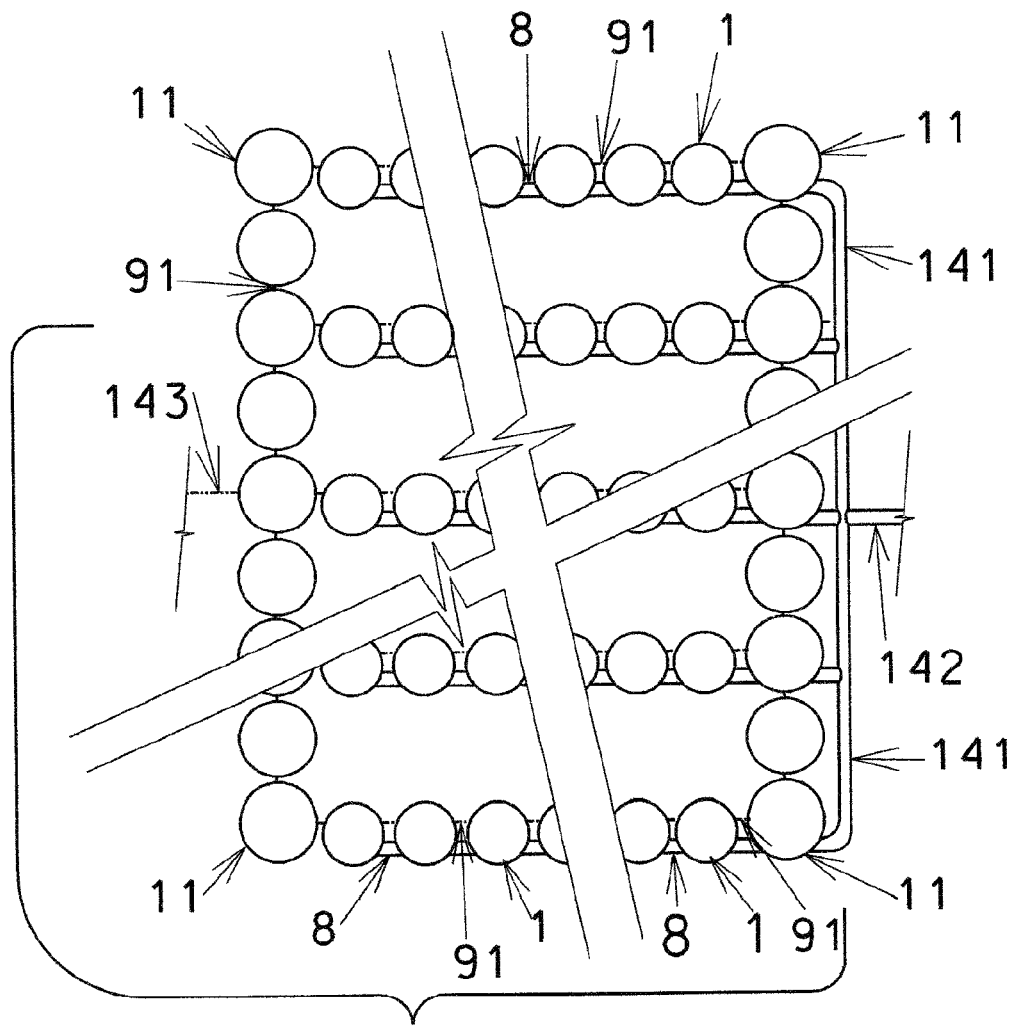
FIG. 14 is a schematic plan view which illustrates the uses of the invented device on ocean surface.
Figure 15:
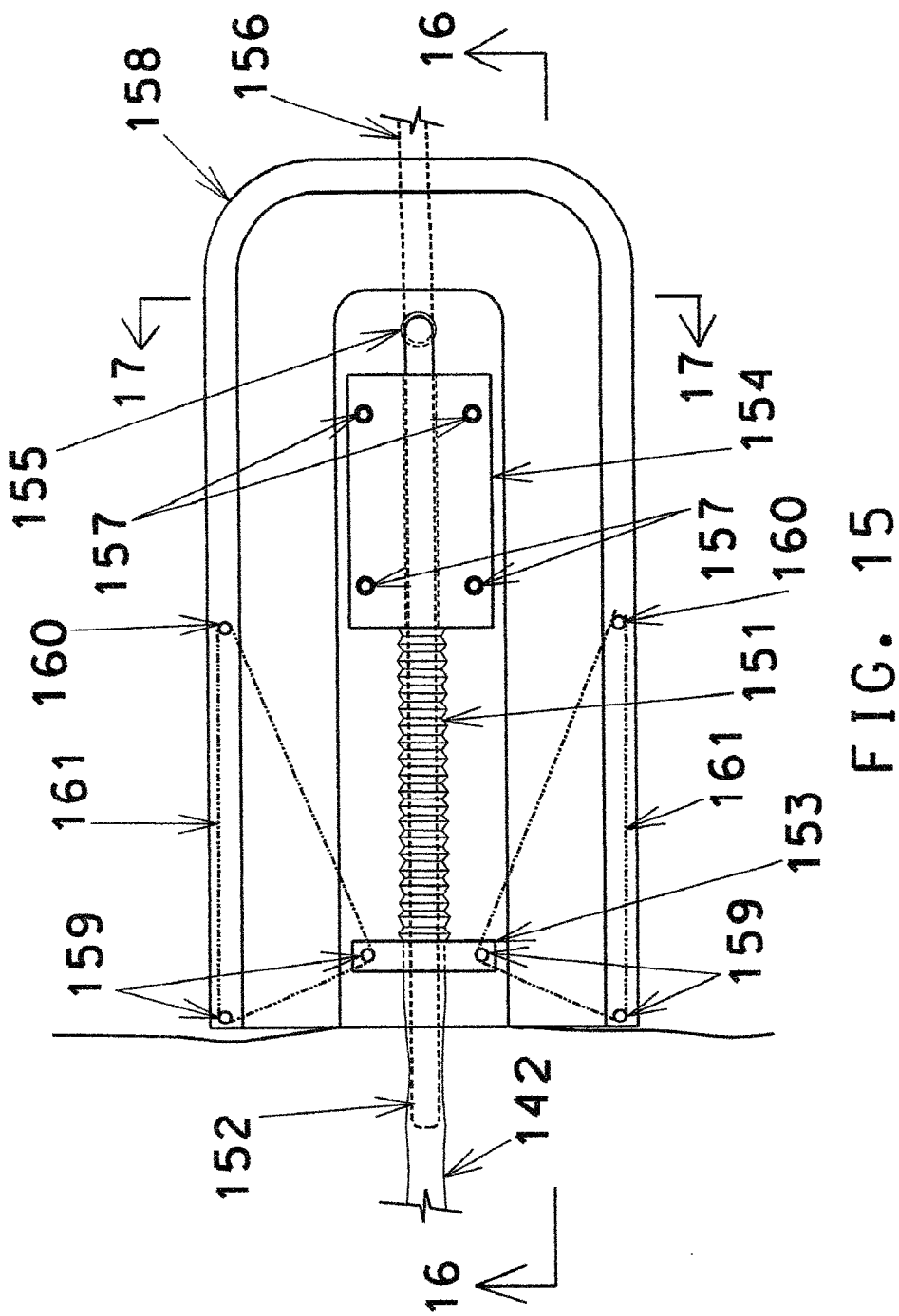
FIG. 15, FIG. 16 and FIG. 17 are schematic plan and two section views, respectively, which illustrate the means to bring freshwaters collected by the devices shown in FIG. 14 onto a shore.
Figure 16:
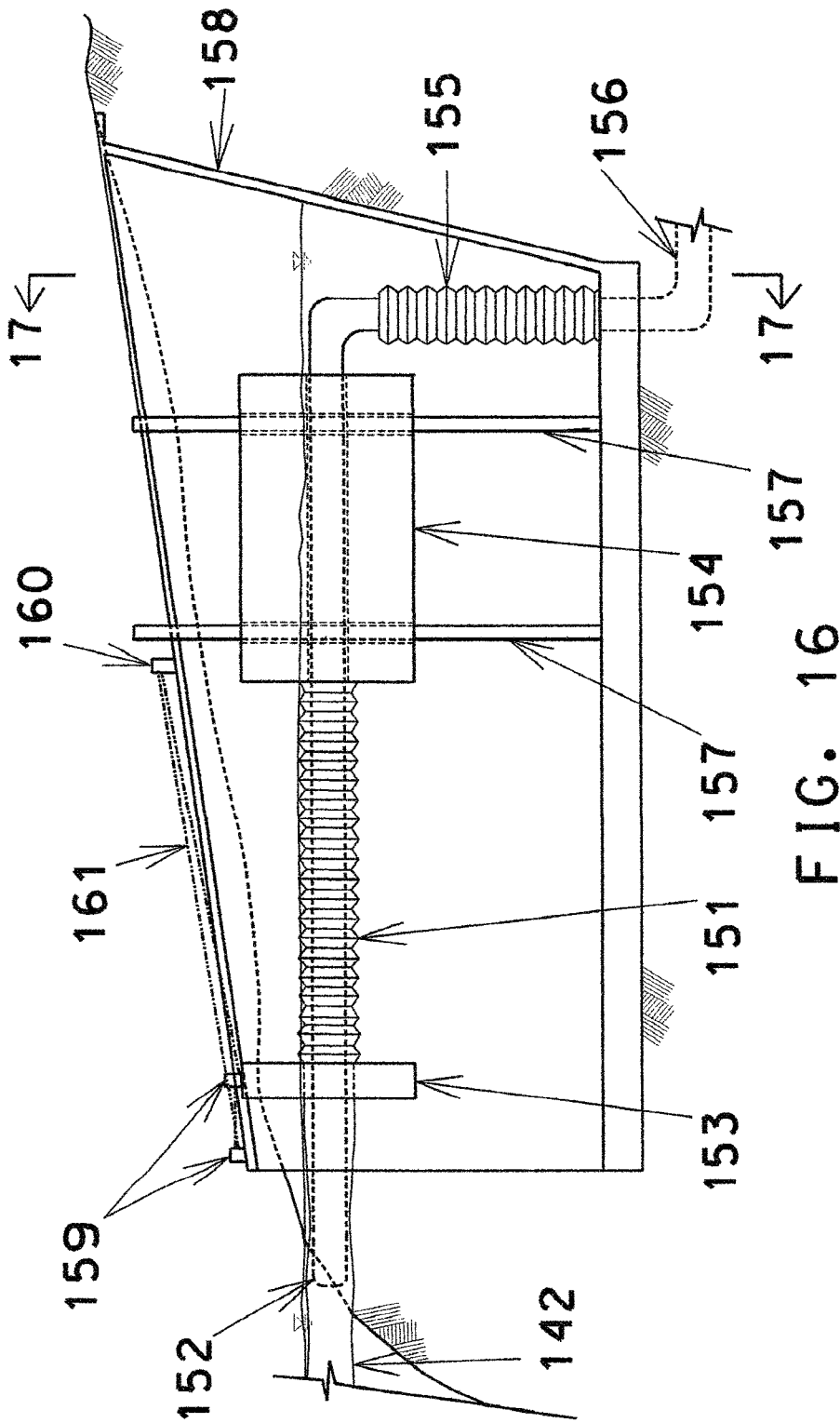
Figure 17:
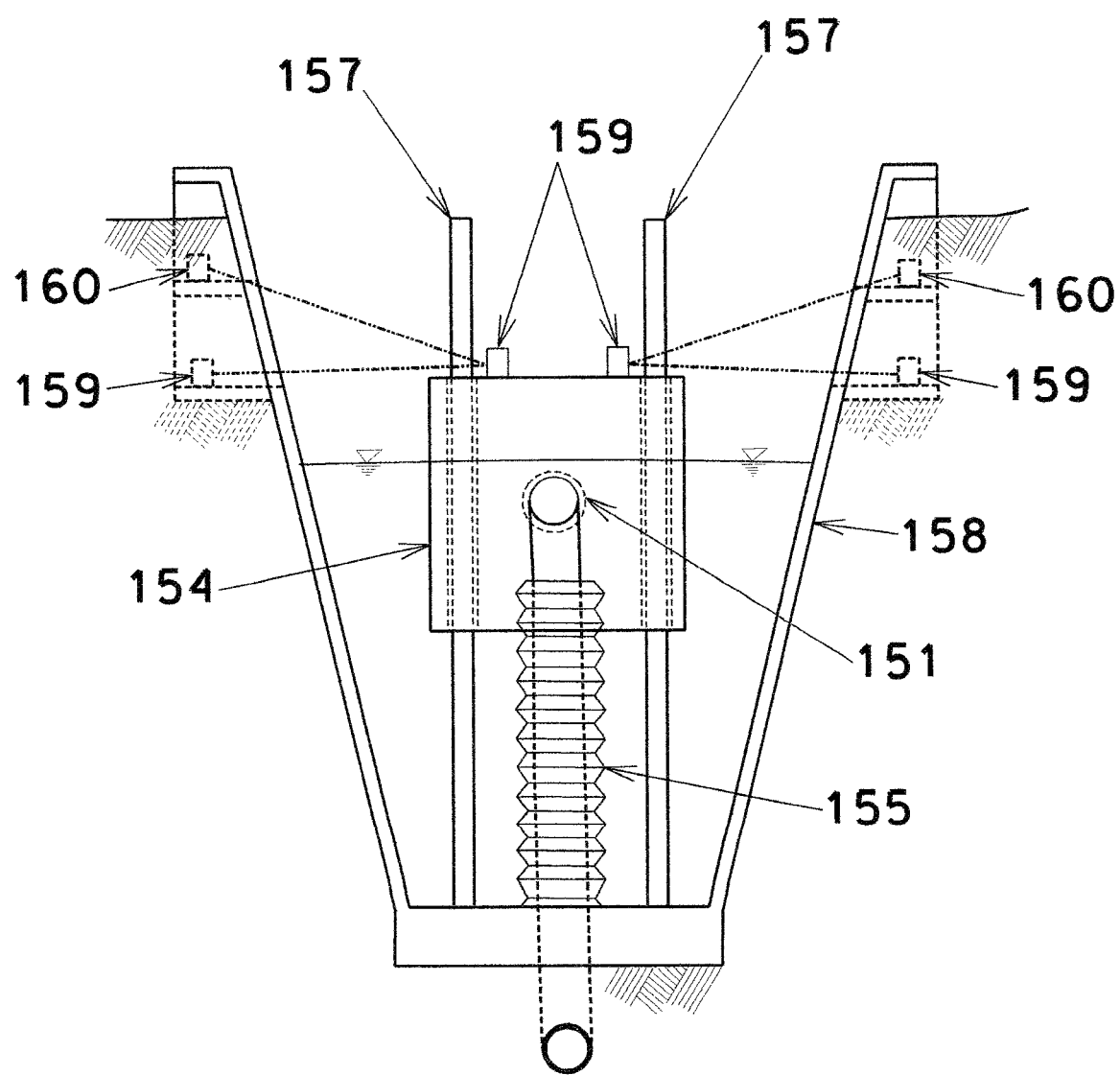

FIG. 14 illustrates an example for the use of the water vapor collector on an ocean surface. The water vapor collectors 1 are pulled together by ropes 91. The spacers 11 are used at both ends of a row of the water vapor collectors to prevent them from bumping each other. The ends of the water tubes 8 are connected to the tubes 141 which join a tube 142 and convey water onto a shore (not shown). At the opposite side of the robe 142, an anchor (not shown) is connected to the rope 143. Referring to FIG. 15, FIG. 16 and FIG. 17, at near the shore the end of the tube 142 is connected to a horizontal bellow pipe 151 which the other end is sealed on the exterior surface of a water pipe 152. A front float 153 is at the sea side end of the bellow pipe ad a rear float 154 is at the shore side end of the bellow pipe. Both floats can float on water surface. The water pipe 152 penetrates both of the floats. A portion of the water pipe 152 is inside the tube 142 and the horizontal bellow pipe 151. The front float 153 can move longitudinally along the water pipe. The other end of the water pipe 152 bends downward and connects to a vertical bellow pipe 155 which connects to another pipe, the outlet pipe 156. The rear float 154 has four float guides 157 which are anchored on the floor of the water receiving basin 158 made of the reinforced concrete. A pulley 159 is on the rim of the water receiving basin and on the top of the front float. A couple of winches 160 are on the rim of the basin. A rope system 161 connects the pulleys and the winches. Water in the tube 142 will enter the water pipe 152 through which and the vertical bellow pipe 155 water will flow into the outlet pipe 156 to be taken away. When tides come, the front float and the rear float will carry the water pipe up or down accordingly. The vertical bellow pipe will extend or contract accordingly also. The winches, the pulleys and the rope systems can shift the positions of the front float according to the tides such that the tube 142 will not be subject to stresses caused by the tides. The rear float will be guided by the float guides 157 which are piles.

Figure 18:
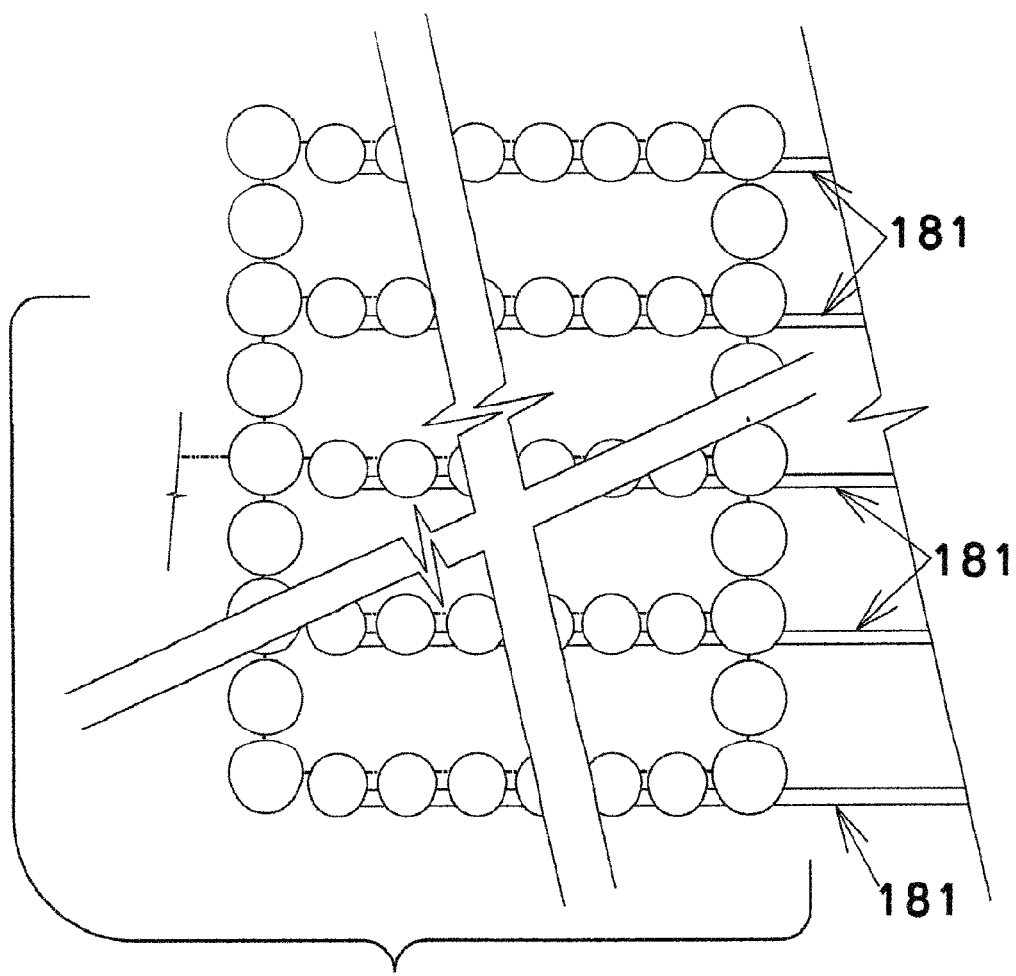
FIG. 18 is a schematic plan view which illustrates another uses of the invented device on ocean surface.
Figure 19:
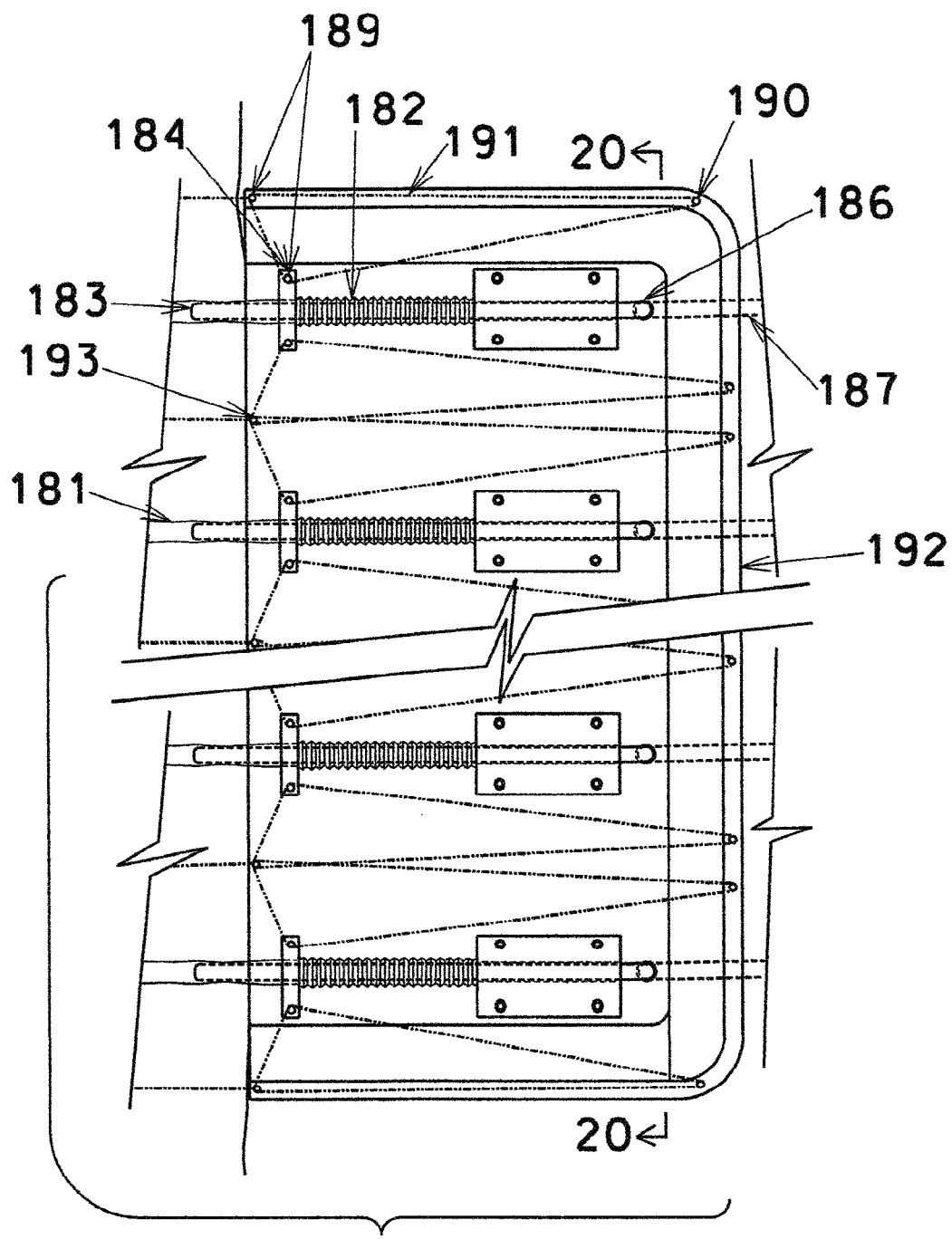

FIG. 18 illustrates another example for the use of the water vapor collector on an ocean surface. The constructions of the water vapor collectors field are fee same as the previous example with the exception that the end of each of the water tube 8 is connected to the tube 181 that does not have branch tubes and conveys water onto a shore (not shown). Referring to FIG. 19 and FIG. 20, at near the shore the end of each tube 181 is connected to a water off loading facility similar to feat described, in the previous example except that this facility has multiple horizontal bellow pipes 182, water pipes 183, front floats 184, rear floats 185, vertical bellow pipes 186, outlet pipes 187, float guides 188, pulleys 189, winches 190, rope systems 191 in the same water receiving basin 192. Pulleys that cannot be mounted on the rim of the basin will be mounted on poles 193. Water in the tube 181 will be handled in a similar way as described in the previous example.

The foregoing is considered as illustrative only of the principles of the invention. Furthermore, since numerous modifications and changes will readily occur to those skilled in the art. It is not desired to limit the invention to the exact construction and operation shown and described, and accordingly all suitable modifications and equivalents, may foe resorted to, falling within the scope of the invention as claimed.

We claim:

1. A water vapor collector assembly which consists of:
   a) an optional capillary net which can transport water by capillary forces and which cannot completely block sun ray;
   b) a dome which allows sun light to pass through;
   c) a water conveying channel which has an outlet to collect and convey water;
   d) an optional capillary mat which has an opening and which has dark color as well as which can transport water by capillary forces;
   e) a floatation base which can float on water surfaces and which has two penetrating slots for a rope that each connects to two optional indented slots for a rope, a penetrating slot for a tube with a penetrating opening, and an optional indented slot for a tube;
   f) and a water tube anchor which is a hollow tube with a tab in plural form at one rim;
   g) a rope being able to loop around said two penetrating slots for a rope and said optional indented slots for a rope of said floatation base;
   h) a tube made of flexible material being able to pass through said penetrating slot for a tube of said floatation base, then, to pass through said opening of said optional capillary mat, then, to encompass said water tube anchor, then, to mount its rim to said tab of said water tube anchor;
   i) said optional capillary mat being on top of said floatation base when being used;
   j) said water tube anchor being able to engage with said enlarged penetrating opening of said floatation base;
   k) said water conveying channel being on top of said optional capillary mat or on the top surface of said floatation base;
   l) said dome being able to engage with said floatation base with a portion of said optional capillary mat in between-when said optional capillary mat being used;
   m) said dome being on top of said water conveying channel with a portion of the surface of said dome being on top of said water conveying channel;
   n) said outlet of said water conveying channel being on top of said water tube anchor;
   o) said optional capillary net being on top of said dome when being used.

2. A water vapor collector means which consists of:
   a) a water vapor collector assembly of claim 1 in plural form;
   b) a rope which links said water vapor collector assembly of claim 1 in plural form by looping around each of said two penetrating slots for a rope and said optional indented slots for a rope of said floatation base of said water vapor collector assembly of claim 1;
   c) each end of said rope having an anchoring device which keeps the rope linked to said water vapor collector assembly of claim 1 in relatively fixed place;
   d) a flexible tube in plural form which are laterals of a tube which one end is sealed off while the other end is connected to a water collection device;
   e) each of said flexible tube being mounted to said tab of said water tube anchor of said water vapor collector assembly of claim 1.

3. A water vapor collector means of claim 2 which said tube, which one end is sealed off while the other end is connected to a water collection device, having a flap in plural form.

4. A water vapor collector means of claim 2 in plural form.

5. A water vapor collector means of claim 2 in plural form while each two of said water vapor collector means being separated by at least one separator which is made of light weight material which has an optional indented slot in plural form and a penetrating slot in plural form to facilitate a rope to loop around.

* * * * *